United States Patent
Kanai et al.

(10) Patent No.: US 8,666,384 B2
(45) Date of Patent: Mar. 4, 2014

(54) CORDLESS TELEPHONE SET

(75) Inventors: Hirofumi Kanai, Fukuoka (JP);
Mitsuru Kawamura, Fukuoka (JP);
Kenji Kurosu, Fukuoka (JP)

(73) Assignee: Panasonic Corporation, Osaka (JP)

( * ) Notice: Subject to any disclaimer, the term of this patent is extended or adjusted under 35 U.S.C. 154(b) by 50 days.

(21) Appl. No.: 13/388,533

(22) PCT Filed: Aug. 5, 2010

(86) PCT No.: PCT/JP2010/004947
§ 371 (c)(1),
(2), (4) Date: Feb. 2, 2012

(87) PCT Pub. No.: WO2011/016245
PCT Pub. Date: Feb. 10, 2011

(65) Prior Publication Data
US 2012/0129512 A1  May 24, 2012

(30) Foreign Application Priority Data
Aug. 6, 2009 (JP) ................................. 2009-183009

(51) Int. Cl.
*H04M 3/00* (2006.01)

(52) U.S. Cl.
USPC ......... 455/418; 455/423; 455/426.1; 455/425

(58) Field of Classification Search
USPC ........... 455/426.1, 462, 572, 573, 574, 575.1; 379/433.05, 142.06, 145, 441
See application file for complete search history.

(56) References Cited

U.S. PATENT DOCUMENTS

| 5,752,195 A * | 5/1998 | Tsuji et al. ............... 455/462 |
| 5,809,417 A * | 9/1998 | Nealon et al. ........... 455/426.1 |
| 6,256,519 B1 * | 7/2001 | Newton .................... 455/572 |
| 2007/0155380 A1 * | 7/2007 | Cao et al. ................ 455/426.1 |

FOREIGN PATENT DOCUMENTS

| CN | 1223517 | 7/1999 |
| CN | 1232337 | 10/1999 |
| JP | 6-152705 | 5/1994 |
| JP | 8-340369 | 12/1996 |
| JP | 11-317811 | 11/1999 |
| JP | 2007-243281 | 9/2007 |
| TW | 448643 | 8/2001 |

OTHER PUBLICATIONS

International Search Report dated Aug. 31, 2010.

* cited by examiner

*Primary Examiner* — Kathy Wang-Hurst
(74) *Attorney, Agent, or Firm* — Seed IP Law Group PLLC

(57) ABSTRACT

Disclosed is a cordless telephone set capable of suppressing power consumption during power failures to lengthen the time for a call. A cordless telephone (1) receives power supply from a handset (3) placed on a charging section (26) of a base unit (2), during power failures. In order to suppress current consumption of a secondary battery (BT) of the handset (3), the base unit (2) instructs a base unit radio section (21) to be switched to a transmission power-saving mode in which transmission power of the base unit radio section (21) is reduced down to a level at which no communication error occurs, according to radio wave information transmitted from the handset (3) and indicates the received signal strength of a radio signal from the base unit radio section (21) of the base unit (2), received by a handset radio section (39) of the handset (3).

18 Claims, 18 Drawing Sheets

FIG.3
(A)
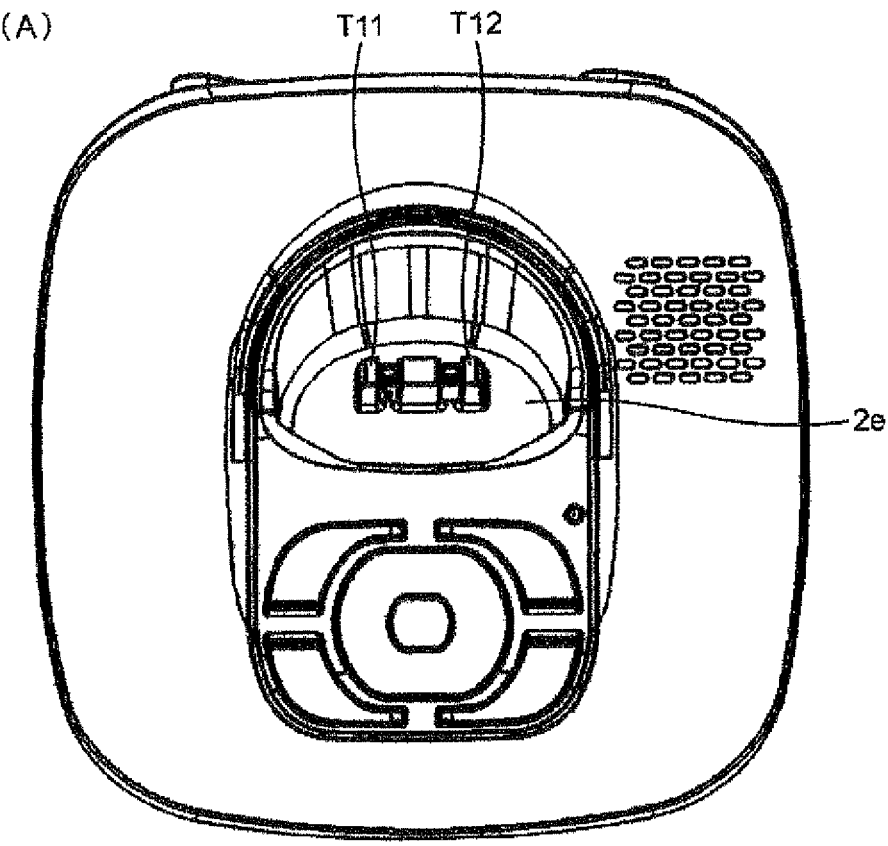
(B)
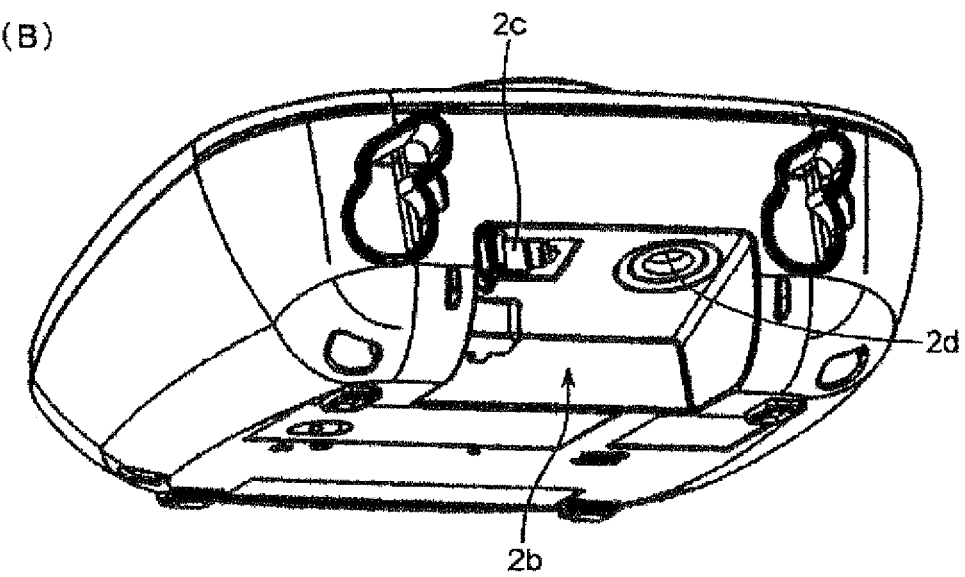

– 1 –
CORDLESS TELEPHONE SET

TECHNICAL FIELD

The present invention relates to a cordless telephone set which includes a cordless handset which is supplied with electric power from a secondary battery and a base unit which is supplied with electric power from a power line.

BACKGROUND ART

A cordless telephone set has high convenience since a user can make a call to the other party through a cordless handset while being at a distance from a base unit connected to a telephone line. However, during a power failure, the base unit cannot obtain electric power from a power line and cannot communicate with the cordless handset. Thus, the user cannot make a call to the other party.

In this respect, a cordless telephone set has been proposed with which a user can make a call to the other party even during a power failure. For example, Patent Literature 1 discloses a cordless telephone set in which if it is detected that a radio link between a cordless handset and a base unit is cut off, a switch circuit of the cordless handset is switched, and thus, electric current from a battery flows in the base unit as backup current so that the base unit and the cordless handset can communicate with each other even during a power failure.

Citation List

Patent Literature

Patent Literature 1: JP2007-243281A

SUMMARY OF INVENTION

Technical Problem

However, the cordless telephone set disclosed in Patent Literature 1 has a problem that the weight of the cordless handset becomes heavy since circuit elements such as a switch circuit and a detection unit are installed in the cordless handset, differently from a normal cordless telephone set which does not support the power-failure feature.

Accordingly, an object of the invention is to provide a cordless telephone set in which electric power can be supplied to a base unit from a secondary battery of a handset in a case where voltage from an external power supply is reduced due to a power failure, plug-out or the like and a light-weight cordless handset can be achieved.

Solution to Problem

An aspect of the invention provides a cordless telephone set which performs radio communication between a handset and a base unit, wherein the base unit includes a first radio communicating section which performs modulation and demodulation with voltage from an external power supply, and a charging circuit which outputs a predetermined voltage based on the voltage from the external power supply, wherein the handset includes a secondary battery which is charged by the predetermined voltage output from the secondary battery when the handset is placed on the base unit, and a second radio communicating section which performs modulation and demodulation with voltage output from the secondary battery, and wherein the base unit further includes a determination unit which determines whether the voltage from the external power supply exceeds a predetermined value, and a switch circuit which cuts off power supply to the first radio communicating section from the secondary battery of the handset placed on the base unit when the determination unit has determined that the voltage from the external power supply exceeds the predetermined value and allows power supply to the first radio communicating section from the secondary battery of the handset placed on the base unit when the determination unit has determined that the voltage from the external power supply does not exceed the predetermined value.

Advantageous Effects of Invention

In the cordless telephone set according to the aspect of the invention, since the determination unit which determines that the voltage from the external power supply is reduced and the switch circuit which allows power supply to the base unit from the secondary battery built-in in the handset are not installed on the side of the handset, it is possible to achieve a light-weight handset and to continue a voice call without imposing a burden on the user.

BRIEF DESCRIPTION OF DRAWINGS

In FIG. 3, (A) is a plan view illustrating a base unit of the cordless telephone set shown in FIG. 1, and (B) is a diagram of the base unit of the cordless telephone set shown in FIG. 1, when seen from a rear side.

DESCRIPTION OF EMBODIMENTS

Figure 1:
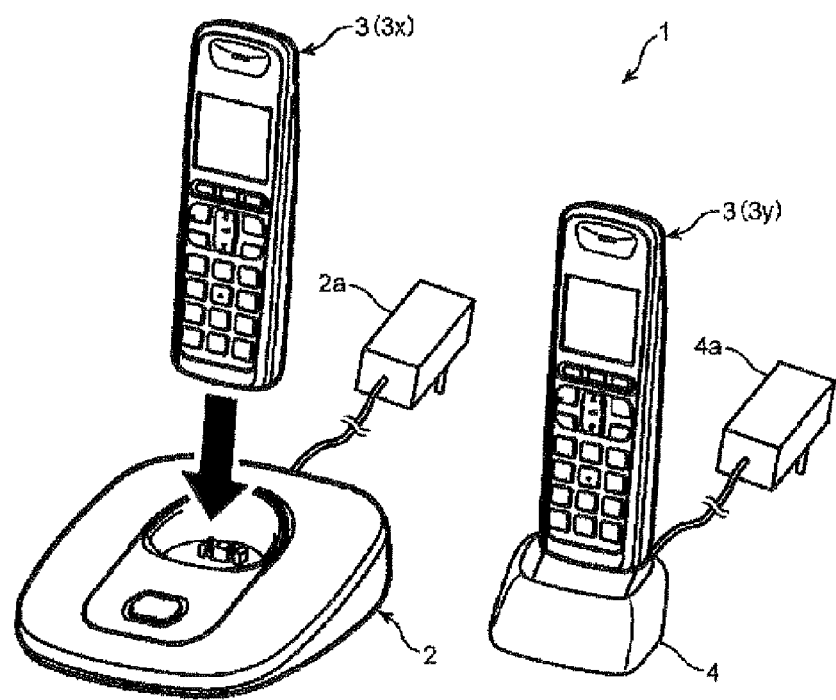
FIG. 1 is a perspective view illustrating a cordless telephone set according to an embodiment of the invention.

According to a first aspect of the invention, there is provided a cordless telephone set which performs radio communication between a handset and a base unit, wherein the base unit includes a first radio communicating section which performs modulation and demodulation with voltage from an external power supply, and a charging circuit which outputs a predetermined voltage based on the voltage from the external power supply, wherein the handset includes a secondary battery which is charged by the predetermined voltage output from the secondary battery when the handset is placed on the base unit, and a second radio communicating section which performs modulation and demodulation with voltage output from the secondary battery, and wherein the base unit further includes a determination unit which determines whether the voltage from the external power supply exceeds a predetermined value, and a switch circuit which cuts off power supply to the first radio communicating section from the secondary battery of the handset placed on the base unit when the determination unit has determined that the voltage from the external power supply exceeds the predetermined value and allows power supply to the first radio communicating section from the secondary battery of the handset placed on the base unit when the determination unit has determined that the voltage from the external power supply does not exceed the predetermined value.

According to the first aspect, since the determination unit which determines that the voltage from the external power supply is reduced and the switch circuit which allows power supply to the base unit from the secondary battery built-in in the handset are not installed on the side of the handset, it is possible to achieve a light-weight handset and to continue a voice call without imposing a burden on the user.

According to a second aspect of the invention, in the cordless telephone set in the first aspect, the base unit further includes a first control section which controls transmission power of the first radio communicating section, the first radio communicating section receives, from the handset, radio wave information which indicates a received signal strength of a radio signal from the first radio communicating section which is received by the second radio communicating section, and the first control section reduces the transmission power of the first radio communicating section in response to the received signal strength indicated by the radio wave information when the determination unit has determined that the voltage from the external power supply does not exceed the predetermined value.

According to the second aspect, when the voltage from the external power supply is reduced, the cordless telephone set is switched to a transmission power-saving mode, and it is thus possible to continue a voice call over a long time.

According to a third aspect of the invention, in the cordless telephone set in the second aspect, the first control section reduces the transmission power of the first radio communicating section down to a level at which no communication error occurs.

According to the third aspect, since the transmission power is reduced down to the level at which no communication error occurs, it is possible to efficiently consume the secondary battery, and to continue a voice call over a long time.

According to a fourth aspect of the invention, in the cordless telephone set in the first aspect, the handset further includes a second control section which starts up a hand-free call function when the handset is placed on the base unit.

According to the fourth aspect, when there is an incoming call in a state where the handset is placed on the base unit, a hand-free call automatically starts without a particular operation of a user for starting up the hand-free call function, and thus, it is possible to make a call in a state where the cordless handset is placed on the base unit.

According to a fifth aspect of the invention, the handset further includes a display section which displays predetermined data, the first radio communicating section transmits predetermined information to the handset when the determination unit has determined that the voltage from the external power supply does not exceed the predetermined value, and the display section displays a state where power supply to the base unit from the external power supply is cut off when the second radio communicating section receives the predetermined information.

According to the fifth aspect, in the cordless telephone set in the first aspect, when the voltage from the external power supply is reduced, it is possible to indicate abnormality of power to the user of the handset, or to encourage the user to place the handset on a charging section of the base unit.

According to a sixth aspect of the invention, in the cordless telephone set in the first aspect, the base unit further includes a capacitor which receives electricity with the voltage from the external power supply or the voltage from the secondary battery.

According to the sixth aspect, even if the external power supply to the base unit is stopped in a state where the cordless handset is separated from the base unit, or even if the base unit is operated with the secondary battery in the cordless handset in a state where the external power supply is stopped and the cordless handset is removed from the base unit in this state, the operation of the base unit is maintained by electric power from the capacitor of a large capacity for a moment, and it is thus possible to maintain a call in a state where the cordless handset and the base unit are separated from each other without sudden disconnection of the call.

According to a seventh aspect of the invention, in the cordless telephone set in the first aspect, the cordless telephone set includes a plurality of handsets, and when any one of the plurality of handsets is placed on the base unit, the first radio communicating section communicates with a different handset which is not placed on the base unit with a predetermined voltage output from the secondary battery.

According to the seventh aspect, when the voltage from the external power supply is reduced, if one of the plurality of handsets which is able to communicate with the base unit is placed on the base unit, it is preferable that the secondary battery of this handset mainly supply electric power for operating the base unit, and it is not necessary that this cordless handset perform a transmission operation for a call, thereby making it possible to suppress power consumption. Further, it is possible for a user to use the other cordless handsets in the state of being separated from the base unit for a call, thereby securing convenience as the cordless telephone set.

According to an eighth aspect of the invention, in the cordless telephone set in the first aspect, the switch circuit includes a semiconductor device including a function as a switching element such as a transistor or an electric field effect transistor.

According to the eighth aspect, since the semiconductor device is used as the switch circuit, it is possible to enhance reliability of the cordless telephone set.

According to a ninth aspect of the invention, in the cordless telephone set in the first aspect, the handset further includes a display section which displays predetermined data, the first radio communicating section transmits predetermined information to the handset when the determination unit has determined that the voltage from the external power supply does not exceed the predetermined value, and the display section performs a display for preventing the handset placed on the base unit from being removed from the base unit when the display section has received the predetermined information by the second radio communicating section and the switch circuit allows power supply to the first radio communicating section from the secondary battery.

According to the ninth aspect, it is possible to prevent a user from removing the handset from the base unit by mistake during operation through the secondary battery of the handset.

According to a tenth aspect of the invention, in the cordless telephone set in the first aspect, the handset further includes a display section which displays predetermined data, the first radio communicating section transmits predetermined information to the handset when the determination unit has determined that the voltage from the external power supply does not exceed the predetermined value, and the display section performs a display for encouraging a user to place the handset on the base unit when the display section has received the predetermined information by the second radio communicating section.

According to the tenth aspect, even though the user does not know that the voltage from the external power supply is reduced, it is possible to encourage the user to place the handset on the base unit.

(Embodiment)

A cordless telephone set according to an embodiment of the invention will be described with reference to the accompanying drawings.

A cordless telephone set 1 shown in FIG. 1 includes a base unit 2 which is connected to a telephone line, two cordless handsets 3 (3x and 3y) which perform a radio communication with the base unit 2. Hereinafter, a cordless handset is simply referred to as a handset. In FIG. 1, one cordless handset 3x is placed on a charging section of the base unit 2 and the other cordless handset 3y is placed on a different charger 4.

The base unit 2 is supplied with electric power by an AC adaptor 2a which is connected to a power line through a socket. The handset 3x is supplied with electric power by being placed on the base unit 2, in which a secondary battery which is installed in the handset 3x is charged. The handset 3y is supplied with electric power from an AC adaptor 4a which is connected to a power line while being placed on the charger 4, in which a secondary battery which is installed in the handset 3y is charged.

Figure 2:
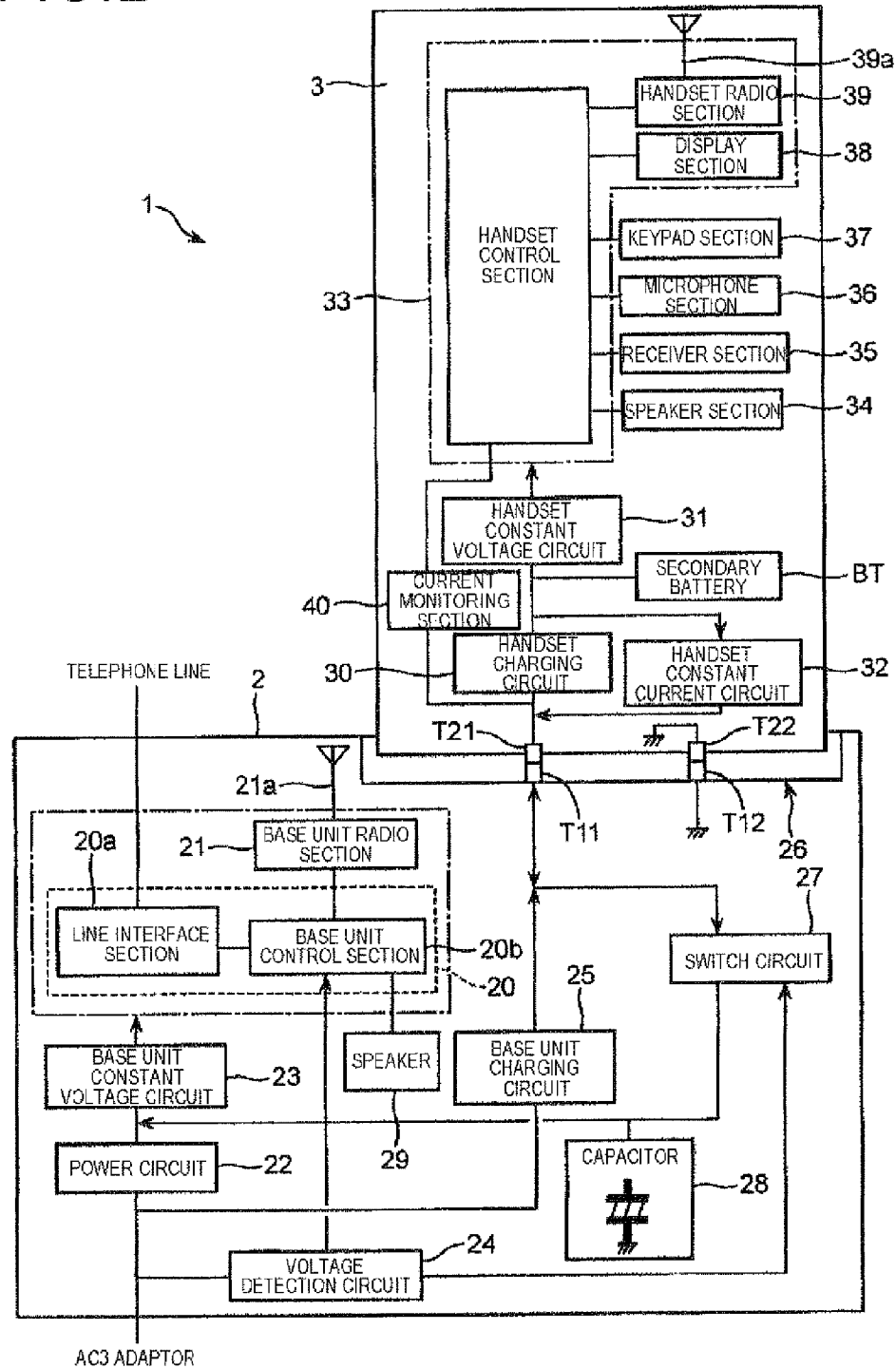
FIG. 2 is a block diagram illustrating a configuration of the cordless telephone set in FIG. 1.

As shown in FIG. 2, the base unit 2 includes a telephone section 20 which is an example of a first control section, a base unit radio section 21 which is an example of a first radio communication section, a power circuit 22, a base unit constant voltage circuit 23, a voltage detection circuit 24, a base unit charging circuit 25, a charging section 26, a switch circuit 27, a capacitor 28, and a speaker section 29.

The telephone section 20 includes a line interface section 20a and a base unit control section 20b. The telephone section 20 may be realized as an integrated circuit. Similarly, the base unit radio section 21 may be also realized as an integrated circuit. Further, both functions of the telephone section 20 and the base unit radio section 21 may be combined as a single integrated circuit.

The line interface section 20a is connected to a telephone line, detects an incoming signal, and has a function of mutually converting an audio analog signal through the telephone line and an analog digital signal with respect to the base unit control section 20b. As shown in (B) of FIG. 3, the line interface 20a is connected to the telephone line in a state where an end of a telephone cable is connected to a dial-up connector 2c which has a socket installed downward a recess section 2b on a rear side and the other end is connected to a modular jack installed on a wall surface.

The base unit control section 20b shown in FIG. 2 overall controls the entire base unit 2. The base unit control section 20b transmits and receives an audio digital signal to and from the handset 3 through the base unit radio section 21, transmits power failure information to the handset 3, or adjusts transmission power with respect to the base unit radio section 21. The base unit control section 20b includes a processor and a peripheral circuit for operating the processor.

The base unit radio section 21 performs modulation and demodulation so that the base unit 2 which is a main control station and the handset 3 which is a slave station can communicate with each other through TDMA (time-division multiple access), and transmits and receives an audio digital signal to and from the handset 3 through an antenna 21a. Further, the base unit radio section 21 includes a function of adjusting transmission power of a radio signal to the handset 3 by an instruction from the base unit control section 20b.

The power circuit 22 is a DC/DC converter which reduces a DC voltage from the AC adaptor 2a which is connected to an external power connector 2d installed in the recess section 2b shown in (B) of FIG. 3 to supply electric power of an appropriate voltage. In the present embodiment, the power circuit 22 is a down-converter which converts DC 6.5 V from the AC adaptor 2a to DC 2.5 V.

The base unit voltage circuit 23 is a constant voltage source which supplies a stable DC voltage to the telephone section 20 and the base unit radio section 21, and further reduces DC 2.5 V from the power circuit 22 to DC 1.8 V.

If the voltage detection circuit 24 detects that the DC voltage from the AC adaptor 2a is a predetermined voltage or less, the voltage detection circuit 24 validates a power failure detection signal to notify the base unit control section 20b and the switch circuit 27 that the power failure occurs. Further, if the voltage detection circuit 24 detects that the DC voltage from the AC adaptor 2a returns to the predetermined voltage or more, the voltage detection circuit 24 invalidates the power failure detection signal to notify the base unit control section 20b and the switch circuit 27 the power return occurs.

Figure 5:
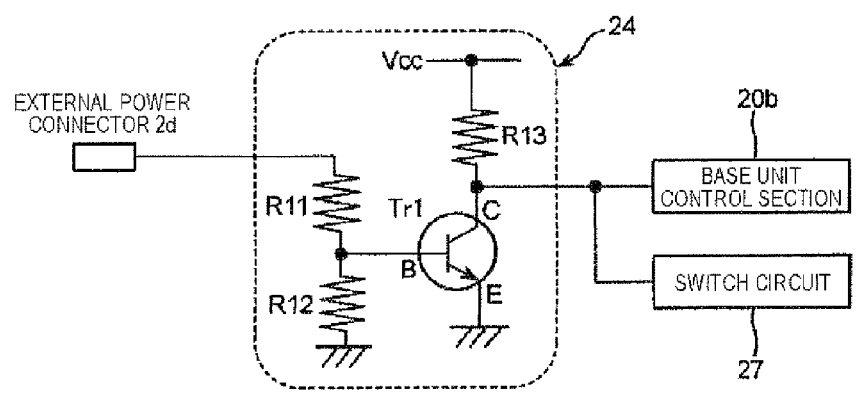
FIG. 5 is a circuit diagram illustrating an example of a voltage detection circuit of the base unit shown in FIG. 2.

Here, an example of the voltage detection circuit 24 will be described in detail with reference to FIG. 5. In the present embodiment, the voltage detection circuit 24 includes divided resistors R11 and R12 which are connected to the external power connector 2d, and a transistor Tr1 which includes a base B connected to a contact of the divided resistor R11 and R12, a collector C connected to a power supply Vcc through a resistor R13, and an emitter E which is grounded. The collector C of the transistor Tr1 is connected to the switch circuit 27 and is also connected to the base unit control section 20b, so that the voltage detection circuit 24 transmits the presence or absence of power supply from the outside.

Figure 6:
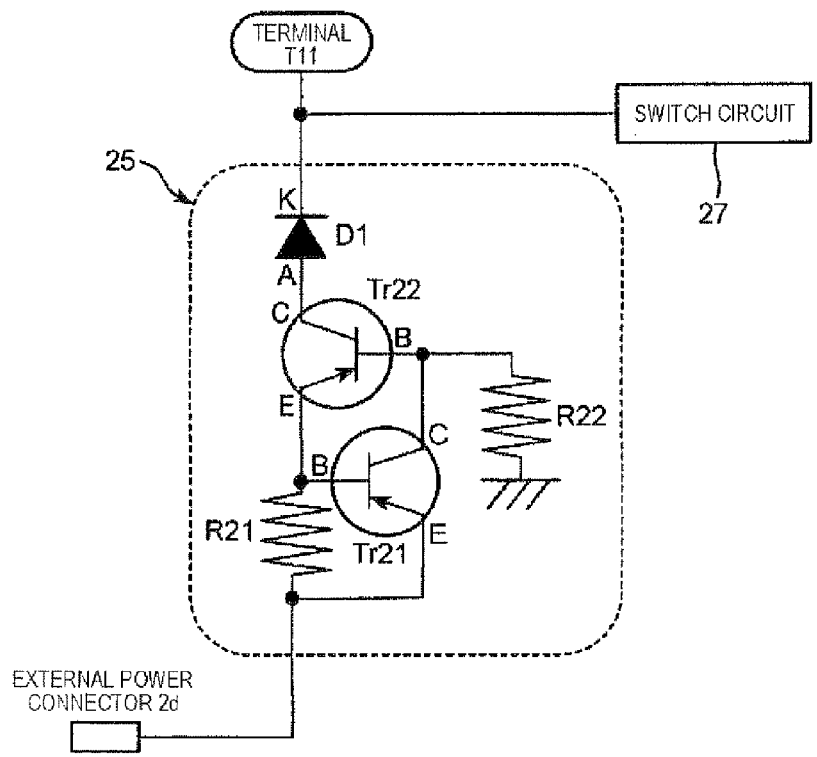
FIG. 6 is a circuit diagram illustrating an example of a base unit charging circuit of the base unit shown in FIG. 2.

The base unit charging circuit 25 is a constant current source which outputs a constant current for charging a secondary battery BT which is installed in the handset 3. Here, an example of the base unit charging circuit 25 will be described in detail with reference to FIG. 6. The base unit charging circuit 25 includes transistors Tr21 and Tr22, resistors R21 and R22 and a diode D1. The transistor Tr21 includes an emitter E which is connected to the external power connector 2d and an end of the resistor R21, a base B which is connected to the other end of the resistor R21 and an emitter E of the transistor Tr22, and a collector C which is connected to a base B of the transistor Tr22 and an end of the resistor R22. The transistor Tr22 includes a collector C which is connected to an anode A of the diode D1. The resistor R22 has the other end which is grounded. A cathode K of the diode D1 which serves as a backflow prevention circuit is connected to a terminal T11 of the charging section 26 (which will be described later in detail), to thereby prevent electric current flowing as a backup current from the handset 3 from flowing back into the base unit charging circuit 25.

The charging section 26 is a recess section 2e which is formed on the base unit 2 as shown in FIG. 3A, for example. The handset 3 is placed in the recess section 2e during charging. Two terminals T11 and T12 are installed on the bottom of the recess section 2e. The terminals T11 and T12 are first terminals for supplying a charging current to the secondary battery of the handset 3. The terminal T11 is a positive terminal and the terminal T12 is a ground terminal which is connected to a ground of the base unit 2.

The switch circuit 27 includes a semiconductor device which has a function of a switching element such as a transistor and an electric field effect transistor. The switch circuit 27 becomes a cut-off state if the power failure detection signal from the voltage detection circuit 24 is invalid (non-power failure state), and becomes a connection state if the power failure detection signal is valid (power failure state).

In the cut-off state, a line between the terminal T11 and the base unit constant voltage circuit 23 is electrically cut off. The electrical cut-off includes a case where the charging current from the secondary battery BT does not flow to the telephone section 20 and the base unit radio section 21, and also includes a case of a current value in which the telephone section 20 and the base unit radio section 21 are not operated even though the charging current from the secondary battery BT flows thereto. Thus, the switch circuit 27 cuts off power supply to the telephone section 20 and the base unit radio section 21 through the terminals T21 and T11 from the secondary battery BT in a case where electric power is supplied from the external power supply of the cordless telephone set 1.

On the other hand, in the connection state, the line between the terminal T11 and the base unit constant voltage circuit 23 is electrically connected. The electrical connection includes a case where the charging current from the secondary battery BT flows to the telephone section 20 and the base unit radio section 21, and also includes any current value as long as the current value does not exceed an electric value allowed by the telephone section 20 and the base unit radio section 21 and can operate the telephone section 20 and the base unit radio section 21. Thus, the switch circuit 27 performs power supply to the telephone section 20 and the base unit radio section 21 through the terminals T21 and T11 from the secondary battery BT in a case where power supply from the external power supply (for example, electric power from the socket) of the cordless telephone set 1 is stopped.

Figure 7:
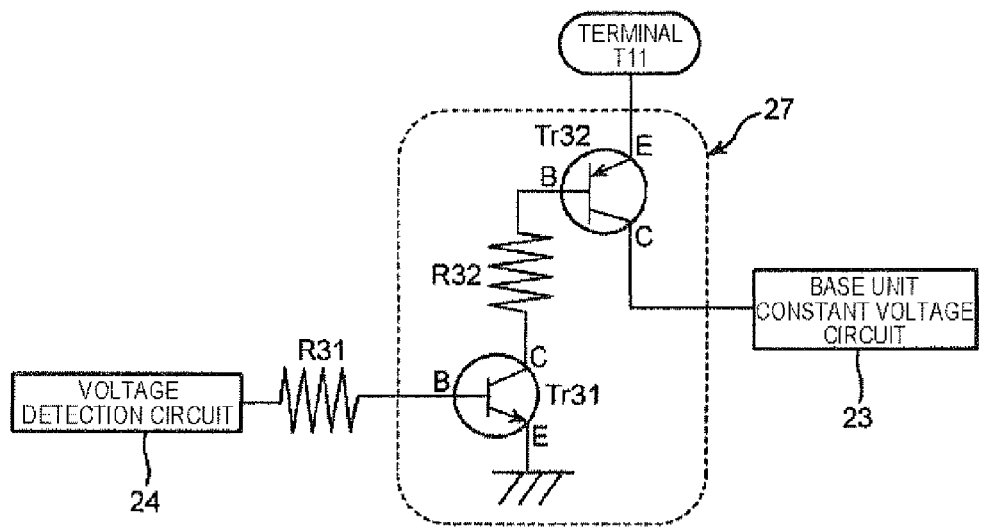
FIG. 7 is a circuit diagram illustrating an example of a switch circuit of the base unit shown in FIG. 2.

Here, an example of the switch circuit 27 will be described in detail with reference to FIG. 7. The switch circuit 27 includes transistors Tr31 and Tr32, and a resistor R32. The transistor Tr31 includes a base B which is connected to the voltage detection circuit 24 through a resistor R31, a collector C which is connected to an end of the resistor R32, and an emitter E which is grounded. The transistor Tr32 includes a base B which is connected to the other end of the resistor R32, an emitter E which is connected to the terminal T11, and a collector C which is connected to the base unit constant voltage circuit 23.

The capacitor 28 shown in FIG. 2 is a condenser which is charged by the charging current from the power circuit 22 or the backup current from the handset 3. In the present embodiment, an electric double layer condenser of a large capacity is used as the capacitor 28.

The speaker 29 is a speaker with an amplifier for activating sound for notification of an incoming call, which is output from the base unit control section 20b.

Next, the handset 3 will be described. The handset 3 includes terminals T21 and T22, a handset charging circuit 30, a handset constant voltage circuit 31, a secondary battery BT, a handset constant current circuit 32, a handset control section 33 which is an example of a second control section, a speaker section 34, a receiver section 35, a microphone section 36, a keypad section 37, a display section 38, a handset radio section 39 which is an example of a second radio communicating section, and a current monitoring section 40.

Figure 4:
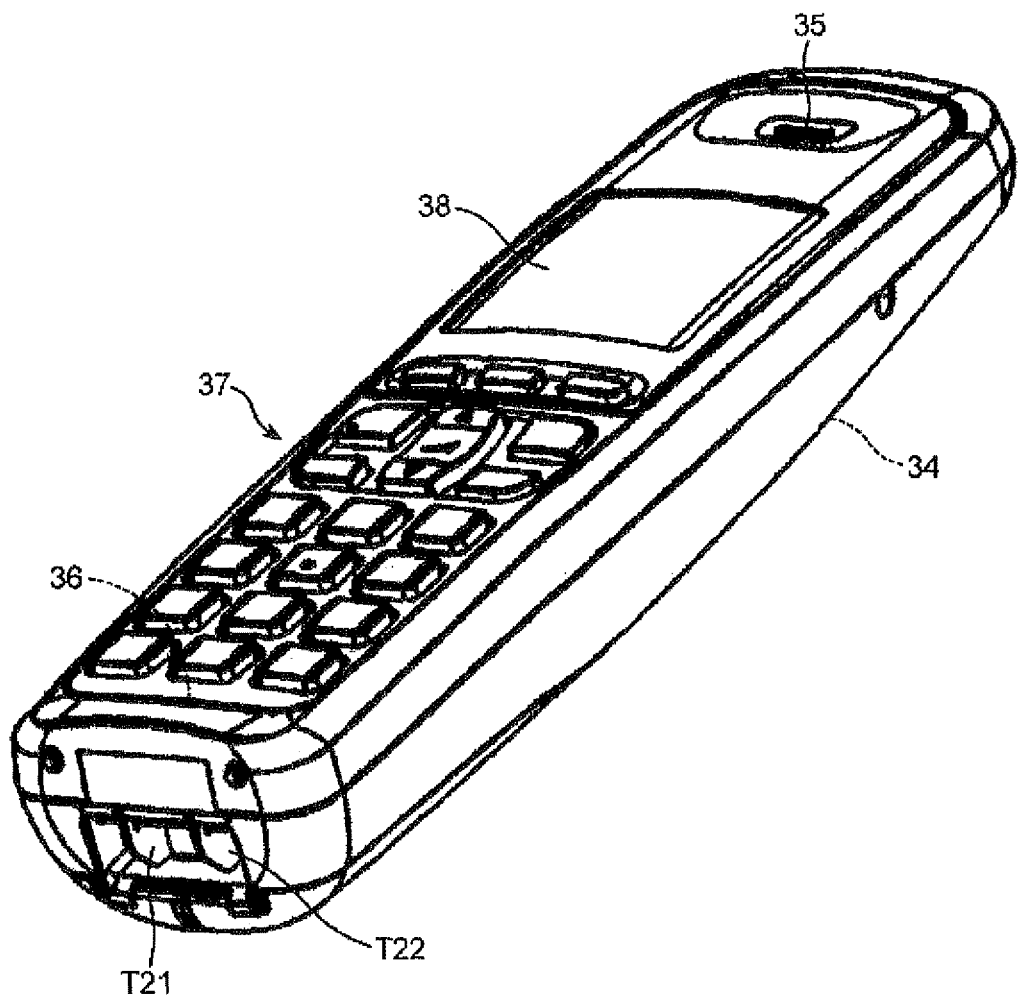
FIG. 4 is a perspective view illustrating a handset of the cordless telephone set shown in FIG. 1.

As shown in FIG. 4, the terminals T21 and T22 which are installed in a base end section of the handset 3 are second terminals, which are in contact with the terminal T11 and T12 when the handset 3 is placed on the charging section 26 of the base unit 2, for input of charging current. The terminals T21 and T22 of the handset 3 are installed on the bottom section of the handset 3 as shown in FIG. 4, so as to be in contact with the terminals T11 and T12 when the bottom section of the handset 3 is placed on the recess section 2e of the base unit 2 shown in FIG. 3A which is the charging section 26.

Figure 8:
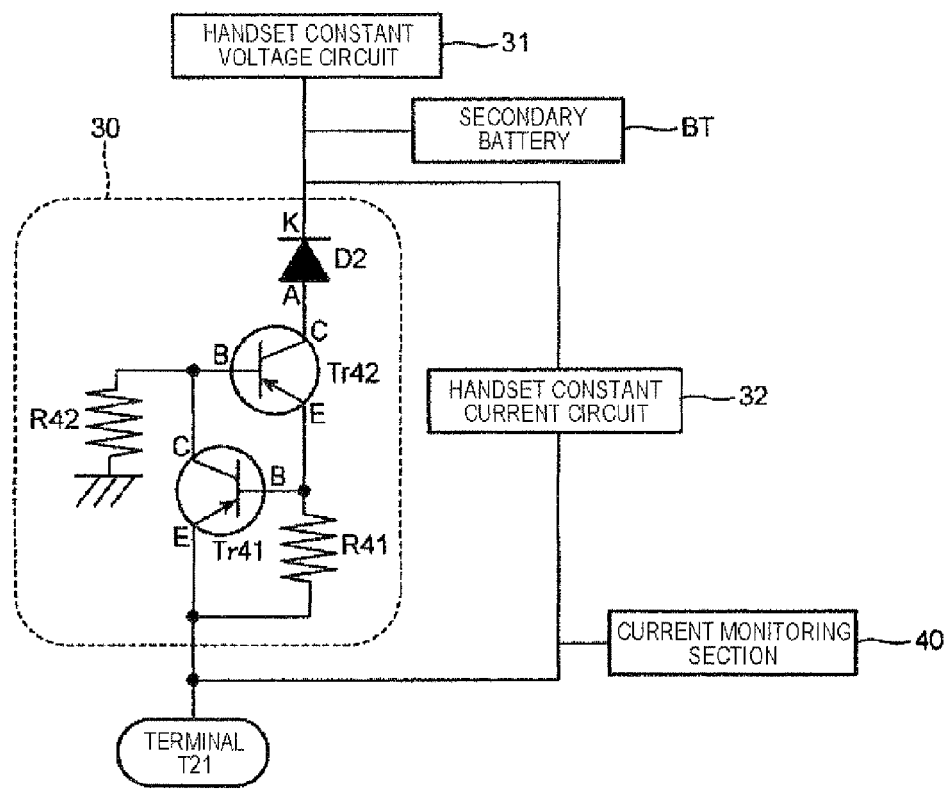
FIG. 8 is a circuit diagram illustrating an example of a handset charging circuit of the handset shown in FIG. 2.

The handset charging circuit 30 receives the charging current supplied from the base unit 2 or the charger 4 and supplies the charging current to the secondary battery BT. For example, as shown in FIG. 8, the handset charging circuit 30 may have the same circuit configuration (see FIG. 6) as that of the base unit charging circuit 25. The handset charging circuit 30 shown in FIG. 8 includes transistors Tr41 and Tr42, resistors R41 and R42, and a diode D2. The transistor Tr41 includes an emitter E which is connected to the terminal T21 and an end of the transistor R41, a base B which is connected to the other end of the resistor R41 and an emitter E of the transistor Tr42, and a collector C which is connected to a base B of the transistor Tr42 and an end of the resistor Tr42. The transistor Tr42 includes a collector C which is connected to an anode A of the diode D2. The resistor R42 includes the other end thereof which is grounded. A cathode K of the diode D2 which serves as a backflow prevention circuit is connected to the secondary battery BT, to thereby prevent the backup current from the secondary battery BT from flowing back into the handset charging circuit 30.

The handset constant voltage circuit 31 is a constant voltage source which supplies a stable DC voltage to the handset control section 33, the keypad section 37, the display section 38, and the handset radio section 39, and reduces DC 2.5 V from the power circuit 22 of the base unit 2 to DC 1.8 V.

The handset constant current circuit 32 supplies the backup current from the secondary current BT to the base unit 2 through the terminals T21 and T11 when power supply from the outside is stopped. Here, an example of the handset constant current circuit 32 will be described with reference to FIG. 9.

Figure 9:
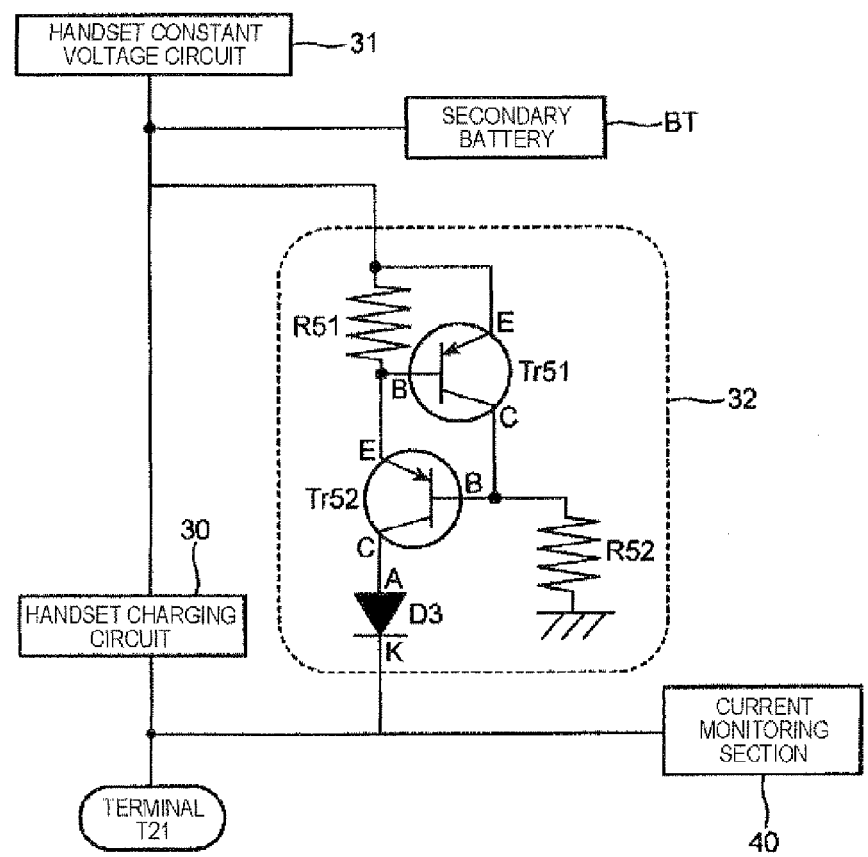
FIG. 9 is a circuit diagram illustrating an example of a handset constant current circuit of the handset shown in FIG. 2.

The handset constant current circuit 32 shown in FIG. 9 may have the same configuration (see FIG. 6) as that of the base unit charging circuit 25. The handset constant current circuit 32 includes transistors Tr51 and Tr52, resistors R51 and R52, and a diode D3. The transistor Tr51 includes an emitter E which is connected to the secondary battery BT and an end of the transistor R51, a base B which is connected to the other end of the resistor R51 and an emitter E of the transistor Tr52, and a collector C which is connected to a base B of the transistor Tr52 and an end of the resistor R52. The transistor Tr52 includes a collector C which is connected to an anode A of the diode D3. The resistor R52 includes the other end thereof which is grounded. A cathode K of the diode D3 which serves as a backflow prevention circuit is connected to the terminal T21, to thereby prevent the charging current from the base unit 2 from flowing back into the handset constant current circuit 32.

The handset control section 33 shown in FIG. 2 overall controls the entire handset 3. The handset control section 33 transmits and receives an audio digital signal to and from the base unit 2 through the handset radio section 39 or performs control according to the power failure information from the base unit 2. Further, the handset control section 33 notifies a received signal strength indicator (RSSI) of a radio signal from the base unit 2 measured by the handset radio section 39 to the base unit 2.

As shown in FIG. 4, the speaker section 34 is installed on a rear side of the handset 3, and amplifies an audio signal from the handset control section 33 by the amplifier for audio output during a hand-free call. The receiver 35 is a speaker which is installed in a tip end section of the handset 3 for audio reproduction. The microphone section 36 receives audio and outputs the audio to the handset control section 33 as an audio signal. The keypad section 37 is an operation key group which includes numeric keys, symbol keys and functional keys. Each key of the keypad section 37 includes an LED which is formed of a light transmissive resin and functions as a backlight inside thereof. The display section 38 is an LCD which performs a display on the basis of display data in the handset control section 33.

The handset radio section 39 performs modulation and demodulation for communication with the base unit 2 through TDMA, and transmits and receives an audio digital signal to and from the base unit 2 through an antenna 39a. Further, the handset radio section 39 measures the received signal strength of a radio signal from the base unit 2, and notifies the result to the handset control section 33 as radio wave information.

The current monitoring section 40 monitors whether the handset constant current circuit 32 allows electric current to flow to the base unit 2 from the secondary battery BT, and notifies an electric conduction state to the handset control section 33.

A usage state and an operation of the cordless telephone set 1 as configured above according to the embodiment of the invention will be described.

Firstly, a normal usage state in a non-power failure state will be described. When power supply is possible from the outside, DC 6.5 V is supplied from the AC adaptor 2a. If electric power is supplied from the external power connector 2d, a voltage drop occurs at the contact of the divided resistors R11 and R12 due to the split ratio, in the voltage detection circuit 24 shown in FIG. 5. Accordingly, the transistor Tr1 becomes in an on-state, and thus, electric current flows to the emitter E from the collector C. Thus, an output (power failure detection signal) of the collector C becomes an L level indicating the non-power failure state (invalid). The invalidity of the power failure detection signal is indicated to the switch circuit 27, and also is indicated to the handset control section 20b.

In the switch circuit 27, as the L level indicating the invalidity of the power failure detection signal is transmitted to the base B of the transistor Tr31, the transistor Tr31 becomes an off-state. Accordingly, the transistor Tr32 also becomes in an off-state.

DC 6.5 V is supplied to the power circuit 22 from the AC adaptor 2a. In the power circuit 22, DC 6.5 V is converted into 2.5 V. Then, 2.5 V is converted to 1.8 V which is suitable for operation of the telephone section 20 and the handset radio section 21 by the handset constant voltage circuit 23. Further, the electric current from the AC adaptor 2a is supplied to the base unit charging circuit 25, and is supplied to the handset 3 through the terminal T11.

In the handset 3, the electric current is supplied to the handset charging circuit 30 from the terminal T21 which is in contact with the terminal T11 installed in the charging section 26 of the base unit 2. Here, since the diode D3 is installed in the handset constant current circuit 32 and electric potentials of the terminals T11 and T21 are higher than an electric potential on the side of the secondary battery BT, there is no sneak current from the handset constant current circuit 32.

The electric current from the handset charging circuit 30 serves as the charging current for charging the secondary battery BT. Further, as the electric current from the handset charging circuit 30 is supplied to the handset constant voltage circuit 31, electric power with a suitable voltage is supplied to the handset control section 33 and the handset radio section 39 by the handset constant voltage circuit 31.

In this way, electric power is supplied to each section from the external power supply in the non-power failure state, in the cordless telephone set 1.

Figure 10:
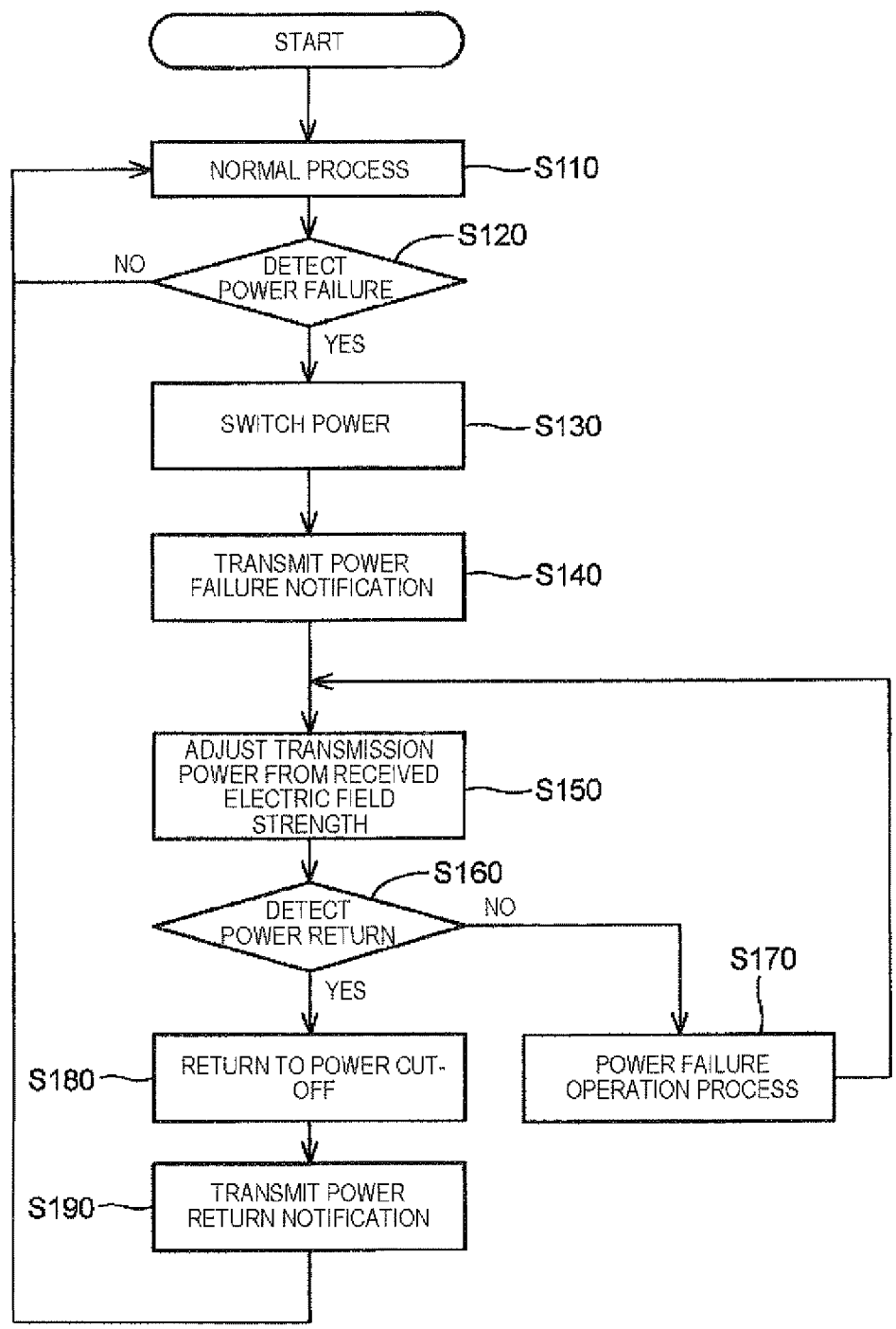
FIG. 10 is a flowchart illustrating an operation of the base unit of the cordless telephone set shown in FIG. 1.

Next, an operation of the base unit 2 in the power failure state will be described with reference to FIG. 10. It is assumed that the handset 3x is placed on the charging section 26 in the base unit 2.

In the non-power failure state, since electric power is supplied from the AC adaptor 2a which is the external power supply, the base unit 2 performs communication with the handset 3x, or performs a normal process of waiting for an incoming call through the telephone line, for example (step S110).

If the power failure occurs, since the voltage from the AC adaptor 2a drops, the electric potential of the contact between the divided resistors R11 and R12 drops in the voltage detection circuit 24 of the base unit 2. Thus, since the transistor Tr1 is in an off-state, the electric potential of the collector C is pulled-up up to the power voltage. Accordingly, the output (power failure detection signal) of the collector C becomes an H level indicating the power failure state (valid). The validity of the power failure detection signal is indicated to the switch circuit 27, and also is indicated to the handset control section 20b. Further, electric current does not flow to the handset 3x from the base unit charging circuit 25 due to the voltage drop from the AC adaptor 2a. Step S110 is repeated when the power failure does not occur (step S120).

As the H level of the power failure detection signal is output from the voltage detection circuit 24, the transistor Tr31 becomes an on-state in the switch circuit 27. According to the on-state of the transistor Tr31, electric current flows between the collector C and the emitter E of the transistor Tr31 through the resistor R32 from the base B of the transistor Tr32. As the transistor Tr32 becomes an on-state due to the voltage drop of the resistor R31 which occurs by this electric current, the terminal T11 and the base unit constant voltage circuit 23 becomes an electric conduction state. According to the electric conduction of the switch circuit 27, the electric current output to the base unit 2 from the secondary battery BT of the handset 3x through the handset constant voltage circuit 32 as a backup current flows in the terminals T21 and T11 and flows in the switch circuit 27, to then be supplied to the base unit constant voltage circuit 23. Thus, the telephone section 20 and the base unit radio section 21 of the base unit 2 can perform a normal operation regardless of the power failure.

Further, in the handset 3x, as electric current from the base unit charging circuit 25 is not supplied, charging of the secondary battery BT is stopped, but electric power from the second battery BT is supplied to the handset control section 33 and the handset radio section 39 of the handset 3x. As electric power is supplied to the secondary battery BT, the handset control section 33 and the handset radio section 39 can maintain the operations (step S130).

If the base unit control section 20b recognizes the power failure by the power failure detection signal from the voltage detection circuit 24, the base unit control section 20b transmits a notification indicating power supply stop to the entire handset 3x as power failure information (step S140).

Further, the base unit control section 20b switches a mode to a transmission power-saving mode in which transmission power of a radio signal in the base unit radio section 21 is adjusted on the basis of the radio wave information from the handset 3x (step S150). In this adjustment, the received signal strength when the radio signal transmitted from the base unit 2 is received by the handset 3 is detected, information about the strength is frequently transmitted to the base unit 2, and the base unit 2 sets transmission power on the basis of the radio wave information from the handset 3x.

Figure 16:
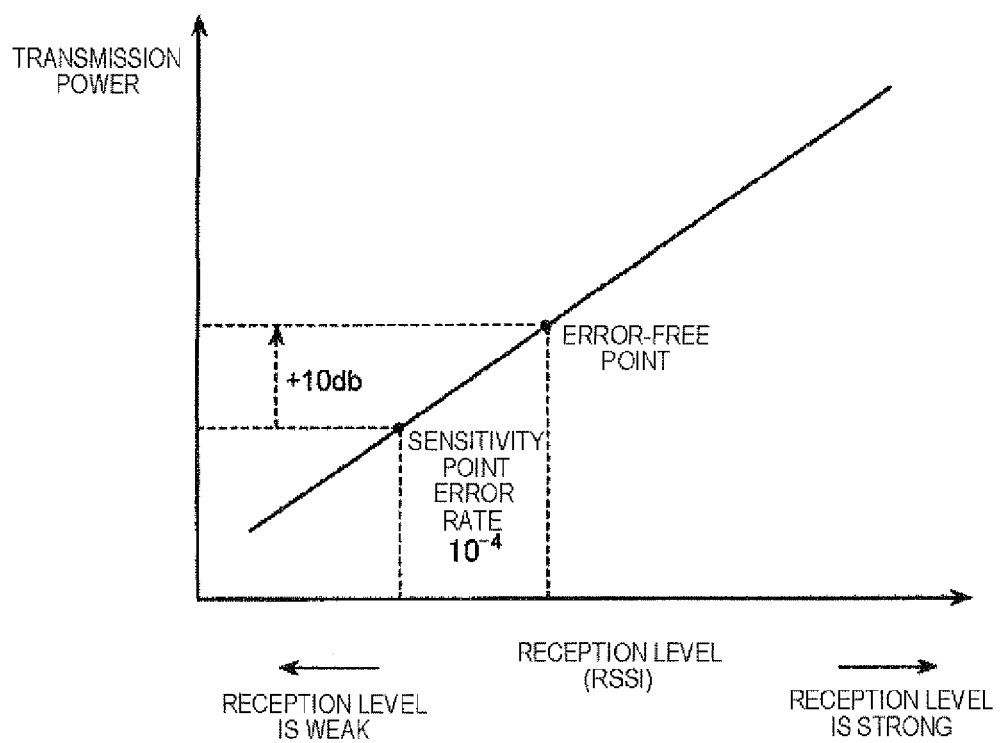
FIG. 16 is a characteristic diagram illustrating the relationship between a reception level, transmission power of a base unit and a communication error rate in a handset.

Here, the control of the transmission power of the base unit corresponding to the reception level in the handset will be described. FIG. 16 shows an example of the relationship between the reception level, the transmission power of the base unit and the communication error rate in the handset, in which the transverse axis represents the reception level (RSSI: received signal strength indicator) in the handset, and the longitudinal axis represents the transmission power of the base unit 2. If the transmission power of the base unit 2 is lowered, the reception level in the handset 3x is lowered, and if the reception level in the handset 3x is lowered, a communication error easily occurs. In FIG. 16, an error-free point is the minimum level in which no communication error occurs in the handset 3x, and it is preferable to set the transmission power of the base unit 2 to the error-free point or higher in order to prevent the communication error from occurring. In the present embodiment, the transmission power of the base unit 2 is controlled so that the reception level may not be less than the error-free point and electric power becomes the minimum possible power (limited transmission power). As the handset 3x and the base unit 2 are close to each other or a communication environment is good, the limited transmission power of the base unit 2 becomes small.

The base unit 2 receives the radio wave information which is frequently transmitted from the handset 3x, and compares the received signal strength with the reception level of the error-free point shown in FIG. 16. The base unit 2 increases and decreases the transmission power based on the comparison result. For example, in the transmission power-saving mode (power failure state), if the handset 3x is separated from the base unit 2, the reception level in the handset 3x from the base unit 2 is lowered. If the reception level is less than the error-free point, the base unit 2 increases the transmission power by one stage. For example, the transmission power of the base unit 2 is a sensitivity point (point in which communication error rate is $10^{-4}$) shown in FIG. 16, the transmission power is increased by 10 dB from the sensitivity point, and thus, it is possible to return the reception level in the handset 3x to the error-free point. If the handset 3x is further separated from the base unit 2, the base unit 2 further increases the transmission power. Before the communication error occurs, it is preferable that the base unit 2 increases the transmission power by one stage. Contrarily, if the handset 3x is close to the base unit 2, the reception level in the handset 3x is increased from the base unit 2. If the received signal strength in the handset 3x is more than the error-free point, a process of lowering the transmission power by one state is performed.

Figure 15:
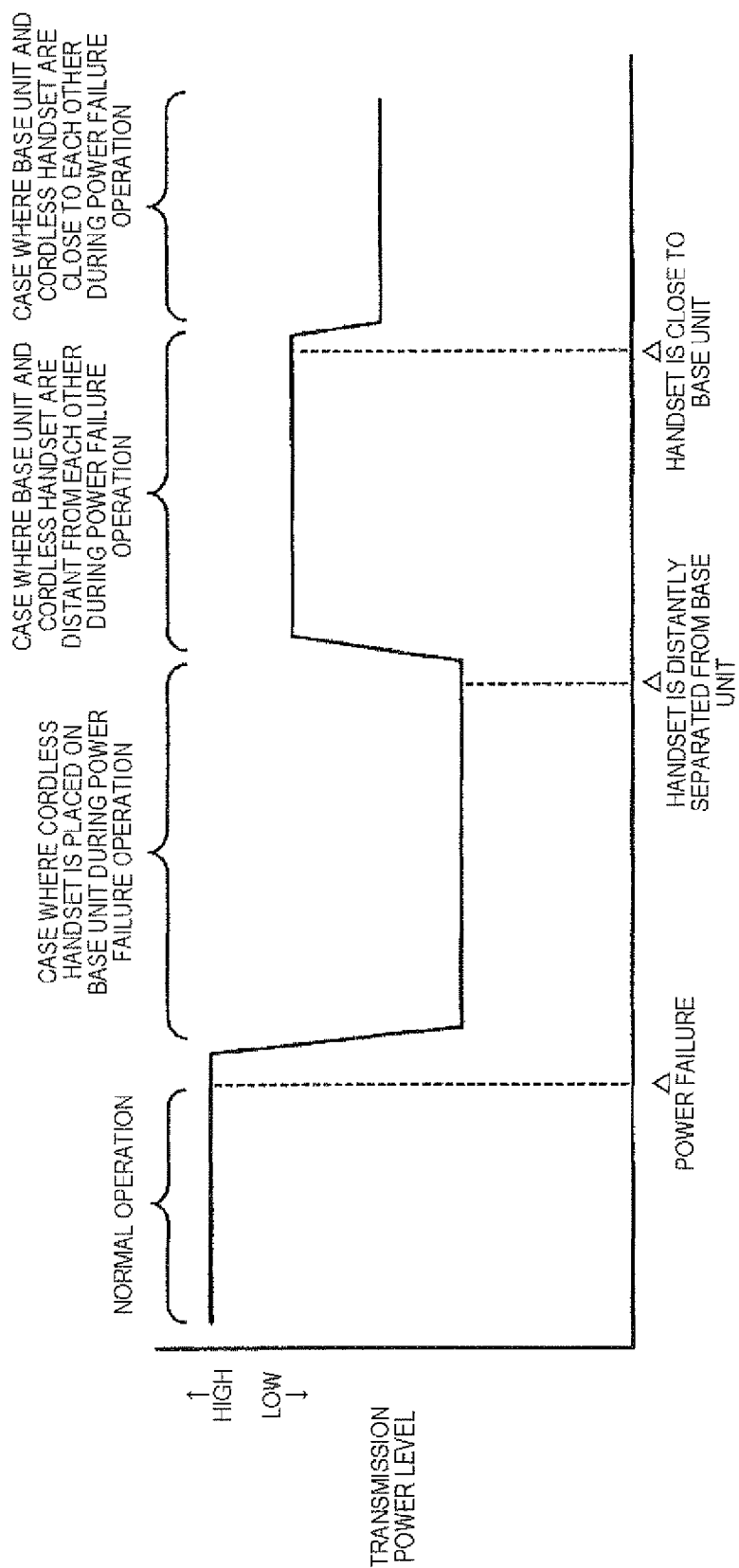
FIG. 15 is a diagram illustrating a transmission power adjustment performed by a base unit.

For example, if the mode is switched to the transmission power-saving mode when the handset 3x is being placed on the base unit 2, since the radio wave information from the handset 3x initially indicates a strong value, the process of lowering the transmission power until the received signal strength in the handset 3x reaches the error-free point is continuously performed in the base unit 2, and the base unit 2 considerably lowers the transmission power (see FIG. 15). Further, in a case where the handset 3x is separated from the base unit 2, since the radio wave information from the handset 3x becomes a weak value, the process of increasing the transmission power is performed so that the received signal intensity maintains a value higher than the error-free point. In this way, the communication in which no communication error occurs is realized with a necessary minimum transmission power (step S150).

The presence or absence of the power failure detection signal is checked in the next step S160, and in a case where the power failure detection signal from the voltage detection circuit 24 is valid, the base unit 2 performs a power failure operation process (step S170). The power failure operation process in the base unit 2 cuts off electric power of the amplifier of the speaker section 29, decreases the clock frequency of the processor used in the base unit control section 20b, or extends an interval at which the base unit radio section 21 monitors an empty slot or an empty channel, thereby reducing electric power consumed by the base unit 2.

If the power state is recovered from the power failure, the power failure detection signal from the voltage detection circuit 24 becomes invalid. As the invalidity of the power failure detection signal is indicated to the base unit control section 20b, the base unit control section 20b detects the non-power failure state. According to the recovery from the power failure state, electric power is supplied to the power circuit 22 and the base unit charging circuit 25 from the AC adaptor 2a, and the charging current is supplied to the handset 3x from the base unit charging circuit 25. Further, as the power failure detection signal is invalid, the switch circuit 27 cuts off the electric conduction, and thus, electric current from the handset 3x does not flow (step S180). Further, the base unit control section 20b transmits a notification indicating power return to the handset 3x (step S190).

In this way, the base unit 2 returns to the normal process of step S110.

Next, an operation of the handset 3x which is placed on the charging section 26 of the base unit 2 will be described with reference to FIG. 11.

Since electric power is supplied from the base unit 2 in the non-power failure state, the handset 3x performs the normal operation (step S210).

If power failure occurs, since the base unit 2 transmits the notification indicating power supply stop in step S140 (see FIG. 10), the handset control section 33 of the handset 3x receives the notification indicating power supply stop, to thereby detect the power failure state. If the power state is not the power failure state, the procedure returns to step S210 (step S220).

Figure 17:
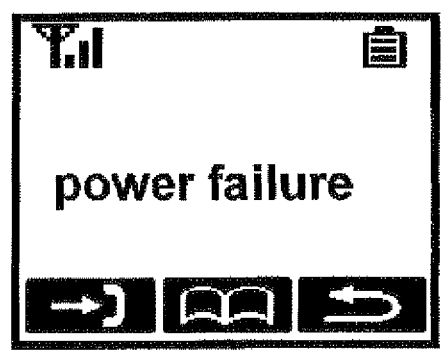
FIG. 17 is a diagram illustrating an example of a state where a message is displayed on a handset display section of the cordless telephone set according to the embodiment of the invention.
Figure 18:
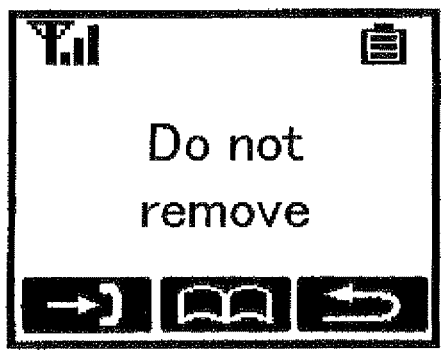
FIG. 18 is a diagram illustrating an example of a state where a message is displayed on the handset display section of the cordless telephone set according to the embodiment of the invention.

If the handset control section 33 detects the power failure state, the display section 38 displays a message such as "External power is cut off", that is, a state where power supply to the base unit 2 from the external power supply is stopped (step S230). FIG. 17 shows an example of a state where this message is displayed. Further, in a case where the power failure state is detected and the backup current flows into the base unit 2 from the constant current circuit 32 of the handset 3x, the display section 38 displays a message such as "External power is cut off. Please do not remove the handset" is displayed, and may display a message for encouraging a user to maintain the state of being placed in the charging section 26, that is, a message indicating prohibition of the handset 3x from being removed from the handset 2. FIG. 18 shows an example of a state where this message is displayed.

Next, in step S240, it is determined whether the handset 3x receives the notification indicating power return from the base unit 2. In a case where the notification indicating power return from the base unit 2 is not transmitted, since the power state is the power failure state, the power failure operation is performed (step S250).

Since the power failure operation process of the handset 3x reduces the brightness of the backlight of the keypad section 37 or the display section 38 or extends the interval at which the handset radio section 39 monitors the empty slot or the empty channel, electric power consumed by the handset 3x is reduced.

The handset control section 33 receives a radio signal from the base unit 2, and measures the received signal strength indicator (RSSI) of the radio signal by the handset radio section 39. Further, the handset control section 33 transmits the received power strength measured by the handset radio section 39 to the base unit 2 as radio wave information. The base unit 2 performs adjustment of the transmission power in step S150 by the radio wave information.

Figure 19:
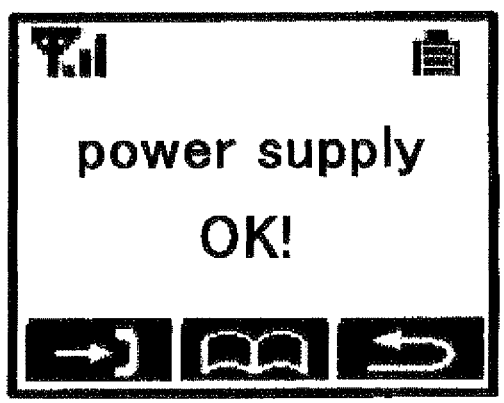
FIG. 19 is a diagram illustrating an example of a state where a message is displayed on the handset display section of the cordless telephone set according to the embodiment of the invention.

If the base unit 2 receives the notification indicating power return transmitted in step S190 through the handset radio section 39 (step S240, Yes), a message such as "External power is restored" is displayed on the display section 38 for a predetermined time (step S260). Further, the procedure returns to step S210, and then the normal process is performed. FIG. 19 shows an example of a state where this message is displayed.

Figure 12:
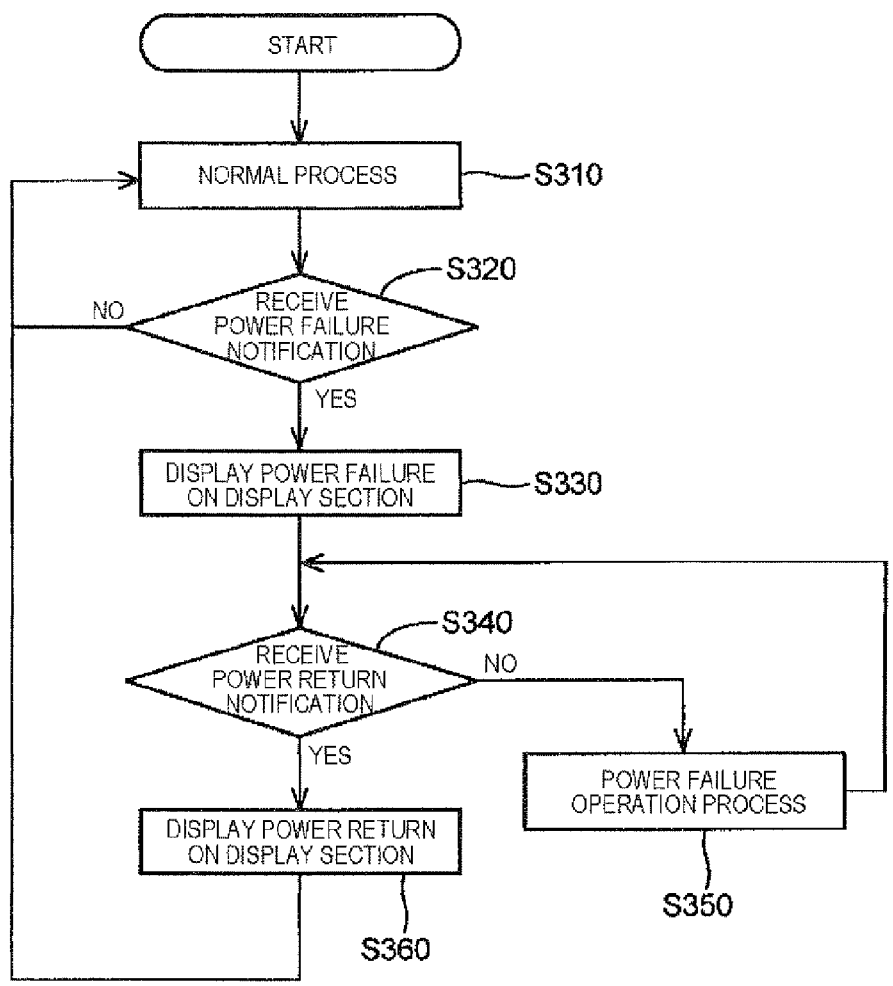
FIG. 12 is a flowchart illustrating, when a handset is placed on a charging section of a base unit, an operation of a different handset.

Next, when one handset 3x is placed on the charging section 26 of the base unit 2, an operation of the other handset 3y which is separated from the base unit 2 will be described with reference to FIG. 12.

If the secondary battery BT of the handset 3y is sufficiently charged, the handset 3y is supplied with electric power from the secondary battery BT, to thereby perform the normal process (step S310).

If a power failure occurs, since the base unit 2 transmits the notification indicating power supply stop in step S140 (see FIG. 10), the handset control section 33 of the handset 3y receives the notification indicating power supply stop, and detects the power failure state. If the power state is not the power failure state, the procedure returns to step S310 (step S320).

As the handset control section 33 of the handset 3y detects the power failure state, a power failure occurrence message such as "External power is cut off" is displayed on the display section 38 (step S330).

It is determined in step S340 whether the notification indicating power return from the base unit 2 is received by the handset control section 33 (step 340). In a case where the notification indicating power return is not received, since the power state is the power failure state, the power failure operation process is performed (step S350).

In the power failure operation process of the handset 3y, as the brightness of the backlight of the keypad 37 or the display section 38 is reduced or the interval at which the handset radio section 39 monitors the interval of the empty slot and the empty channel is extended, electric power consumed by the handset 3y is reduced.

Further, the handset control section 33 of the handset 3y receives a radio signal from the base unit 2, and measures the received signal strength of the radio signal by the handset radio section 39. Further, the handset control section 33 transmits the received signal strength measured by the handset radio section 39 to the base unit 2 as radio wave information. The base unit 2 performs adjustment of the transmission power in step S150 by the radio wave information.

If the handset control section 33 receives the notification indicating power return transmitted by the base unit 2 in step S190 through the handset radio section 39, the handset 3y displays a message such as "External power is restored" on the display section 38 for a predetermined time (step S360). Further, the procedure returns to step S310, and then, the normal process is performed.

When communicating with the handset 3y, the base unit control section 20b of the base unit 2 may receive power supply from the secondary battery BT of the handset 3x placed on the base unit 2, and may perform the communication with a predetermined voltage output by the secondary battery BT.

Figure 13:
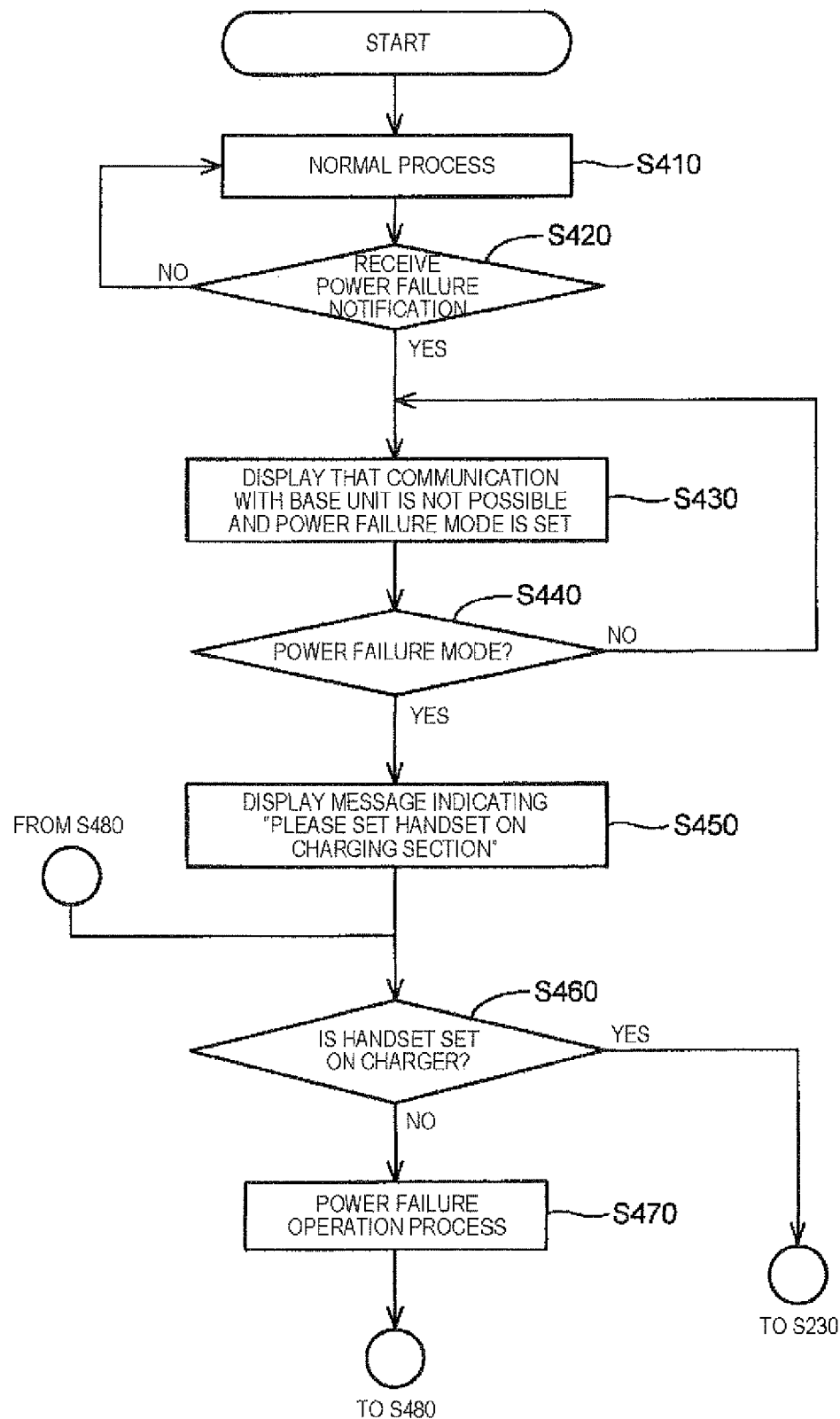
FIG. 13 is a flowchart illustrating, when a handset is not placed on a charging section of a base unit, an operation of a different handset.

Next, an operation of the handset (handset 3x) in a case where any handset 3 is not placed on the charging section 26 of the base unit 2 will be described with reference to FIGS. 13 and 14.

The handset 3x is supplied with electric power from the charged secondary battery BT, thereby executing the normal process (step S410).

If a power failure occurs, the handset 3x can detect the power failure state by the notification indicating power supply stop transmitted from the base unit 2. In the present embodiment, since the capacitor 28 is installed in the base unit 2, the base unit 2 can operate for a while by electric power supplied from the capacitor 28 in spite of the power failure state. Accordingly, as the base unit radio section 21 operates even though power supply from the outside is stopped, the base unit 2 can transmit the notification indicating power supply stop to the handset 3 and the handset 3x can receive the notification (step S420). Further, in a case where the operation of the base unit radio section 21 of the base unit 2 is stopped, since the handset 3x cannot communicate with the base unit 2, the handset control section 33 of the handset 3x recognizes that the communication is not possible, to thereby detect the power failure state. If the power failure state is detected in step S410, the procedure goes to step S430, and if the power failure state is not detected, the procedure returns to step S410 to continue the normal process.

Figure 20:
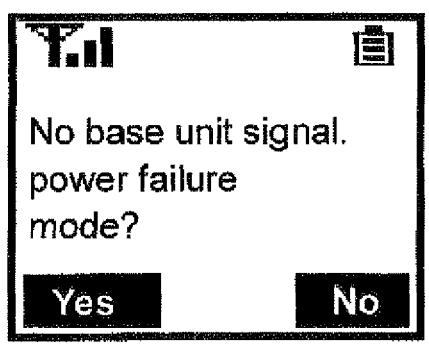
FIG. 20 is a diagram illustrating an example of a state where a message is displayed on the handset display section of the cordless telephone set according to the embodiment of the invention.

The handset control section 33 of the handset 3x displays a message such as "External power is cut off. You cannot communicate with the base unit. Please switch the mode to the power failure mode." for encouraging a user to switch the handset 3x to the power failure mode on the display section 38, under the conditions that the power failure state is detected, and that the handset 3x is separated from the base unit 2 and the backup current does not flow into the base unit 2 from the handset constant current circuit 32 (step S430). FIG. 20 shows an example of a state where this message is displayed.

A user views the message displayed in the display section 38 and operates the keypad section 37 in which a functional key of setting the power failure mode is installed. The handset control section 33 determines whether the functional key of setting the power failure mode is operated. If the functional key is not operated, the procedure goes to step S430 and waits for the operation (step S440).

Figure 21:
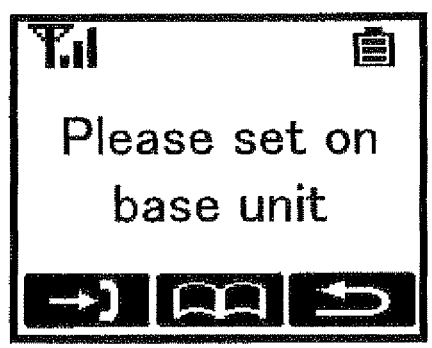
FIG. 21 is a diagram illustrating an example of a state where a message is displayed on the handset display section of the cordless telephone set according to the embodiment of the invention.

The handset control section 33 which is in the power failure mode as the functional key of setting the power failure mode is operated displays a message such as "Please set the handset on the base unit" for encouraging a user to mount the handset 3x on the charging section 26 of the base unit 2 on the display section 38 (step S450). FIG. 21 shows an example of a state where this message is displayed.

The handset control section 33 determines whether the handset 3x is placed on the charging section 26 of the base unit 2 according to the presence or absence of the backup current to the base unit 2 from the handset constant current circuit 32 (step S460).

Figure 11:
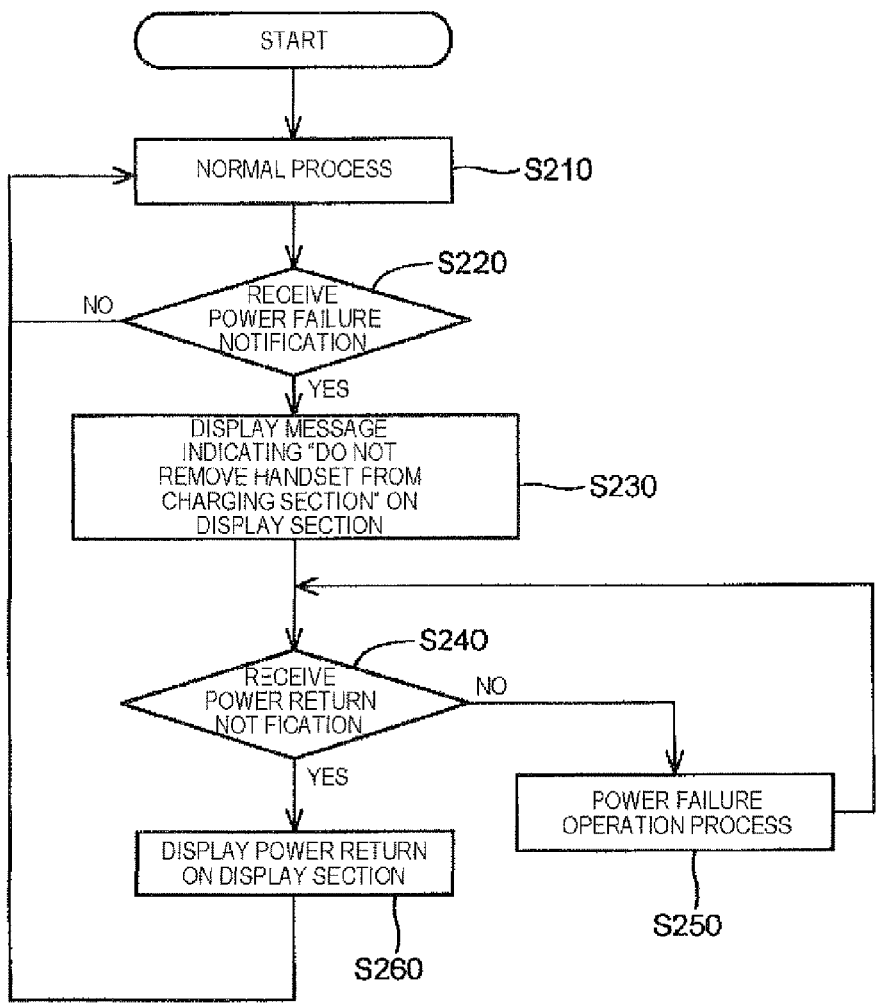
FIG. 11 is a flowchart illustrating an operation of the handset of the cordless telephone shown in FIG. 1 which is placed on a charging section of the base unit.

If it is detected that the backup current to the base unit 2 in the handset 3x is present, it can be determined that the handset 3x is placed on the charging section 26 of the base unit 2, and then the procedure goes to step S230 (FIG. 11).

In a case where it is determined that the handset 3x is not placed on the charging section 26 of the base unit 2, the power failure operation process is performed (step S470).

In the power failure operation process, in a similar way to the step S250 (see FIG. 11), as the brightness of the backlight of the keypad section 37 and the display section 38 is reduced or the interval at which the handset radio section 39 monitors the empty slot or the empty channel is extended, electric power consumed by the handset 3x is reduced.

Figure 14:
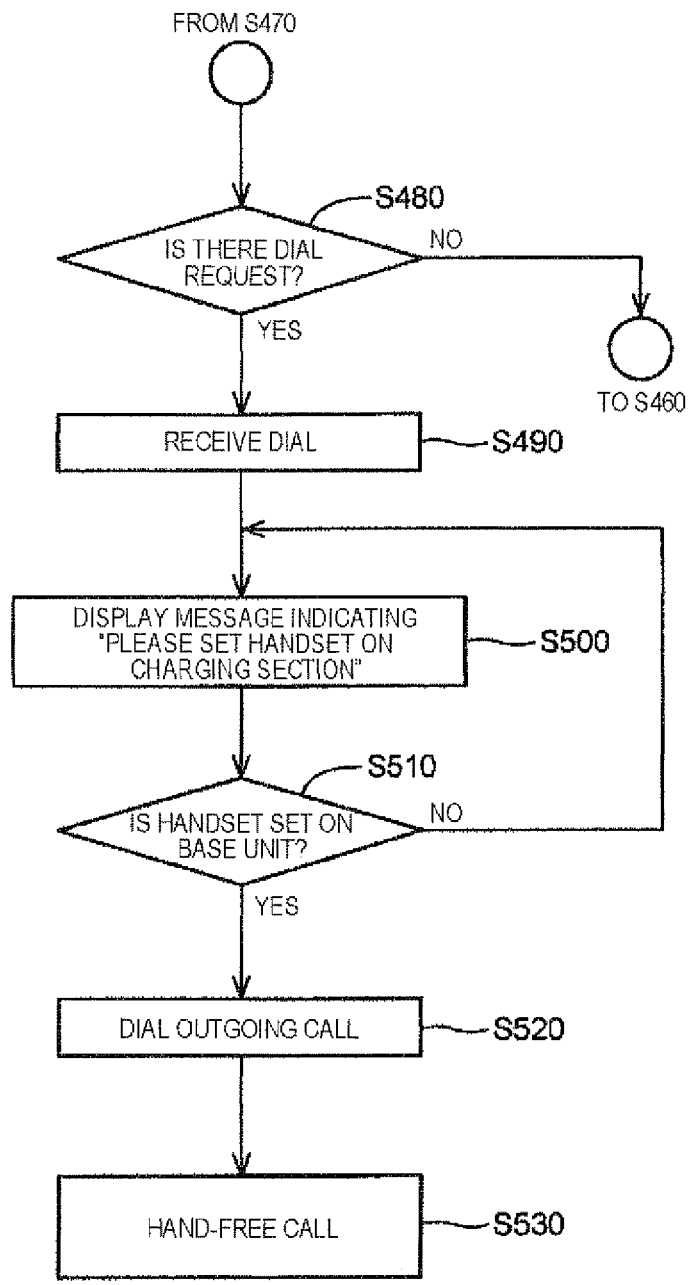
FIG. 14 is a flowchart illustrating an operation of a handset, subsequent to FIG. 13.

As shown in FIG. 14, subsequent to the process in step S470, the handset control section 33 determines whether a dial request is present. The dial request means that a user operates the keypad section 37 to input an origin telephone number. If there is no dial request, the procedure goes to step S460 (step S480).

If there is a dial request, the handset control section 33 receives an input of the dial (origin telephone number). The handset control section 33 stores the received origin telephone number in a storing section in the handset control section 33 (step S490).

Figure 22:
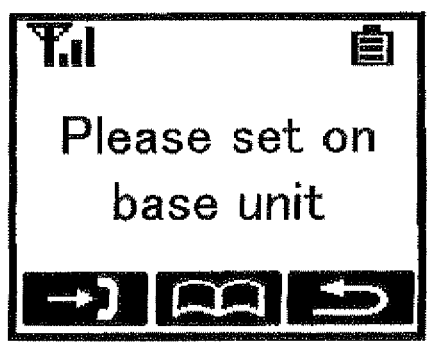
FIG. 22 is a diagram illustrating an example of a state where a message is displayed on the handset display section of the cordless telephone set according to the embodiment of the invention.

The handset control section 33 displays a message such as "Please set the handset on the base unit" of encouraging a user to mount the handset 3x on the charging section 26 of the base unit 2 on the display section 38 (step S500). FIG. 22 shows an example of a state where this message is displayed.

As the backup current flows to the base unit 2 from the handset constant current circuit 32, the handset control section 33 determines whether the handset 3x is placed on the charging section 26 of the base unit 2 (step S510). If the handset 3x is not placed on the charging section 26 of the base unit 2, the procedure goes to step S500.

In a case where it is detected that the handset 3x is placed on the charging section 26 of the base unit 2 by the backup current, the handset control section 33 requests the base unit 2 to make an outgoing call to the origin telephone number stored in the storing section through the handset radio section 39. The base unit 2 makes the outgoing call through the line interface section 20a on the basis of the origin telephone number notified by the base unit control section 20b according to the request from the handset 3x (step S520).

The handset 3x in the power failure mode receives a user's voice through the microphone section 36 and outputs the other party's voice through the speaker section 34, thereby transitioning to the hand-free call state (step S530).

In this way, when power supply to the base unit 2 from the outside is stopped due to the power failure or breakdown of the AC adaptor 2a, the base unit 2 switches the mode to the transmission power-saving mode or reduces the transmission power of the radio signal to the handset 3x up to the level where no communication error occurs, according to the radio wave information indicating the received signal strength of the radio signal from the base unit 2 transmitted from the handset 3x. For example, as shown in FIG. 15, the transmission power is in a high output state in the normal operation, but in the case of the handset 3x which is placed on the base unit 2, it is possible to set the transmission power to the minimum by reducing the transmission output after the power failure occurs. Further, if the handset 3x is separated from the base unit 2, it is possible to set the transmission power to such a degree that no communication error occurs. Further, in a case where the handset 3x is close to the base unit 2 (but is not placed on the base unit 2), it is possible to set the transmission power to be higher than the case where the handset 3x is placed on the base unit 2 or to be lower than the case where the handset 3x is separated from the base unit 2. Accordingly, according to the distance between the base unit 2 and the handset 3x, it is possible to suppress power consumption on the side of the base unit 2 as much as possible and to continue a voice call for a relatively long time.

Further, since the handset control section 33 of the handset 3 can automatically make a phone call through the hand-free call function according to detection of the power failure state through the notification indicating power supply stop from the base unit 2, it is possible to start the call in a state where the handset 3x is placed on the base unit 2 without any operation.

Further, if the power failure state is detected, the base unit 2 can notify the power abnormality to each user who uses the handset 3 by transmitting the notification indicating power supply stop to each handset 3, or can encourage the user to mount the handset 3 on the charging section 26 of the base unit 2.

Since the capacitor 28 which supplies electric power to the base unit constant voltage circuit 23 is installed in the base unit 2, it is possible to transmit the notification indicating power supply stop to the handset 3 on the basis of the notification from the voltage detection circuit 24 even in the power failure state. Further, even though the handset 3 is in the state of being separated from the charging section 26 of the base unit 2 during a call, since the base unit 2 can be operated by electric power supplied from the capacitor 28, it is possible to maintain the call in a state where the handset 3 is separated from the base unit 2 for a while, without cease of the call from the handset 3.

In the case of the base unit 2 in a state where electric power cannot be supplied from the outside as the handset 3x is placed on the charging section 26 of the base unit 2, since electric power is supplied by the second battery BT from the handset 3x, the handset 3y which is separated from the base unit 2 can make a call.

In the base unit 2 of the cordless telephone set 1 according to the present embodiment, the power circuit 22 and the base unit constant voltage circuit 23 are separately configured, but may be combined as a power circuit. Further, the power circuit may be configured to further include the base unit charging circuit 25.

Further, when the power failure occurs during a call as the handset 3x is separated from the base unit 2, if there is no problem even though the call is ceased, it is possible to omit the capacitor 28.

In the above-described embodiment, the communicating section and the control section are separately configured, but may be integrally configured. For example, the communication section and the control section may be configured as a semiconductor integrated circuit which has the functions of the communication section and the control section.

In the above-described embodiment, when the handset 3 of the cordless telephone set 1 is placed on the base unit 2, the terminals T21 and T22 of the handset 3 and the terminals T11 and T12 of the base unit 2 are physically in contact with each other, but the invention is not limited thereto as long as electric power can be supplied to the base unit 2 from the secondary battery BT of the handset 3 in the cordless telephone set 1. This may include an electrical connection or a magnetic connection. For example, a transformer may be installed instead of the terminals T21 and T22 on the side of the handset 3, a transformer may be installed instead of the terminals T11 and T12 on the side of the base unit 2, and the transformer of the handset 3 and the transformer of the base unit 2 may be magnetically combined, to thereby supply electric power.

The invention has been described in detail with reference to the specific embodiments, but it will be apparent to those skilled in the art that a variety of modifications or revisions may be made in a range without departing from the spirit or scope of the invention.

This application is based on Japanese Patent Application No. 2009-183009 filed on Aug. 6, 2009, the contents of which are incorporated herein by reference.

Industrial Applicability

The invention can lengthen the time for a call by suppressing power consumption during a power failure, and is thus suitable for a cordless telephone set including a handset which is supplied with electric power from a secondary battery and a base unit which is supplied with electric power from a power line.

Reference Signs List
1 CORDLESS TELEPHONE SET
2 BASE UNIT
2a AC ADAPTOR
2b RECESS SECTION
2c DIAL-UP CONNECTOR
2d EXTERNAL POWER CONNECTOR
2e RECESS SECTION
20 TELEPHONE SECTION
20a LINE INTERFACE SECTION
20b BASE UNIT CONTROL SECTION
21 BASE UNIT RADIO SECTION
21a ANTENNA
22 POWER CIRCUIT
23 BASE UNIT CONSTANT VOLTAGE CIRCUIT
24 VOLTAGE DETECTION CIRCUIT
25 BASE UNIT CHARGING CIRCUIT
26 CHARGING SECTION
27 SWITCH CIRCUIT
28 CAPACITOR
29 SPEAKER SECTION
T11, T12 TERMINAL
3, 3x, 3y HANDSET
30 HANDSET CHARGING CIRCUIT
31 HANDSET CONSTANT VOLTAGE CIRCUIT
32 HANDSET CONSTANT CURRENT CIRCUIT
33 HANDSET CONTROL SECTION
34 SPEAKER SECTION
35 RECEIVER SECTION
36 MICROPHONE SECTION
37 KEYPAD SECTION
38 DISPLAY SECTION
39 HANDSET RADIO SECTION
39a ANTENNA
40 CURRENT MONITORING SECTION
BT SECONDARY BATTERY
T21, T22 TERMINAL
4 CHARGER
4a AC ADAPTOR

The invention claimed is:

1. A cordless telephone set which performs radio communication between a handset and a base unit,
wherein the base unit includes:
a first radio communicating section which performs modulation and demodulation with voltage from an external power supply; and
a charging circuit which outputs a predetermined voltage based on the voltage from the external power supply,
wherein the handset includes:
a secondary battery which is charged by the predetermined voltage when the handset is placed on the base unit;
a second radio communicating section which performs modulation and demodulation with voltage output from the secondary battery; and
a display section which displays predetermined information, wherein:
the base unit further includes a determination unit which determines whether the voltage from the external power supply exceeds a predetermined value, and
the display section displays information regarding a status of a power supply to the base unit as the predetermined information in the event that the determination unit determines that the voltage from the external power supply does not exceed the predetermined value.

2. The cordless telephone set according to claim 1,
wherein the base unit further includes a first control section which controls transmission power of the first radio communicating section,
the first radio communicating section receives, from the handset, radio wave information which indicates a received signal strength of a radio signal from the first radio communicating section which is received by the second radio communicating section, and
the first control section reduces the transmission power of the first radio communicating section in response to the received signal strength indicated by the radio wave information when the determination unit has determined that the voltage from the external power supply does not exceed the predetermined value.

3. The cordless telephone set according to claim 2,
wherein the first control section reduces the transmission power of the first radio communicating section down to a level at which no communication error occurs.

4. The cordless telephone set according to claim 1,
wherein the handset further includes a second control section which starts up a hand-free call function when the handset is placed on the base unit.

5. The cordless telephone set according to claim 1, wherein
the first radio communicating section transmits predetermined data to the handset when the determination unit has determined that the voltage from the external power supply does not exceed the predetermined value, and
the display section displays a state where power supply to the base unit from the external power supply is cut off when the second radio communicating section receives the predetermined information.

6. The cordless telephone set according to claim 1,
wherein the base unit further includes a capacitor which receives electricity with the voltage from the external power supply or the voltage from the secondary battery.

7. The cordless telephone set according to claim 1,
wherein the cordless telephone set includes a plurality of handsets, and
when any one of the plurality of handsets is placed on the base unit, the first radio communicating section communicates with a different handset which is not placed on the base unit with a predetermined voltage output from the secondary battery.

8. The cordless telephone set according to claim 1,
wherein the switch circuit includes a semiconductor device including a function as a switching element.

9. The cordless telephone set according to claim 1,
wherein the handset further includes a display section which displays predetermined data, the first radio communicating section transmits predetermined information to the handset when the determination unit has determined that the voltage from the external power supply does not exceed the predetermined value, and the display section performs a display for encouraging a user to place the handset on the base unit when the display section has received the predetermined information by the second radio communicating section.

10. The cordless telephone set according to claim 1, further comprising:
a switch circuit which cuts off power supply to the first radio communicating section from the secondary battery of the handset placed on the base unit when the determination unit has determined that the voltage from the external power supply exceeds the predetermined value and allows power supply to the first radio communicating section from the secondary battery of the handset placed on the base unit when the determination unit has determined that the voltage from the external power supply does not exceed the predetermined value.

11. The cordless telephone set according to claim 10,
wherein the first radio communicating section transmits predetermined information to the handset when the determination unit has determined that the voltage from the external power supply does not exceed the predetermined value, and the display section performs a display for preventing the handset placed on the base unit from being removed from the base unit when the display section has received the predetermined information by the second radio communicating section and the switch circuit allows power supply to the first radio communicating section from the secondary battery.

12. The cordless telephone set according to claim 1,
wherein the display section displays information indicating that the external power is unavailable as the information regarding the status of the power supply to the base unit.

13. The cordless telephone set according to claim 1,
wherein the display section displays information for keeping the handset placed on the base unit as the information regarding the status of the power supply to the base unit.

14. The cordless telephone set according to claim 12,
wherein the display section displays information that the external power supply is available as the information regarding the status of the power supply to the base unit in the event that the determination unit determines that the voltage from the external power supply exceeds the predetermined value.

15. A cordless telephone set which performs radio communication between a handset and a base unit which is provided a voltage from an external power supply, wherein:
the base unit includes a determination unit which determines whether the voltage from the external power supply exceeds a predetermined value, and
the handset includes a display section which displays predetermined information, and
the display section displays information regarding a status of a power supply to the base unit as the predetermined information in the event that the determination unit determines that the voltage from the external power supply does not exceed the predetermined value.

16. The cordless telephone set according to claim 15,
wherein the display section displays information indicating that the external power is unavailable as the information regarding the status of the power supply to the base unit.

17. The cordless telephone set according to claim 15,
wherein the display section displays information for keeping the handset placed on the base unit as he information regarding the status of the power supply to the base unit.

18. The cordless telephone set according to claim 16,
wherein the display section displays information that the external power supply is available as the information regarding the status of the power supply to the base unit in the event that the determination unit determines that the voltage from the external power supply exceeds the predetermined value.

* * * * *